United States Patent [19]

Iwaki

[11] Patent Number: 4,680,678

[45] Date of Patent: Jul. 14, 1987

[54] LIGHTING FIXTURE FOR VEHICLE

[75] Inventor: Akihiro Iwaki, Ichihara, Japan

[73] Assignee: Stanley Electric Co., Ltd., Tokyo, Japan

[21] Appl. No.: 888,154

[22] Filed: Jul. 18, 1986

[51] Int. Cl.⁴ .............................................. B60Q 1/00
[52] U.S. Cl. ..................... 362/61; 362/235; 362/290; 362/332; 362/800; 340/72; 340/67; 340/84; 340/87
[58] Field of Search ............... 362/153, 235, 800, 227, 362/61, 145, 228, 290, 332; 340/72, 66, 67, 84, 87

[56] References Cited

U.S. PATENT DOCUMENTS

| 4,298,869 | 11/1981 | Okuno | 362/800 |
| 4,329,625 | 5/1982 | Nishizawa et al. | 362/800 |
| 4,340,929 | 7/1982 | Konikoff et al. | 362/800 |
| 4,628,419 | 12/1986 | Schmid | 362/145 |

FOREIGN PATENT DOCUMENTS 2139340 11/1984 United Kingdom ............... 362/800

*Primary Examiner*—James C. Yeung
*Attorney, Agent, or Firm*—Frishauf, Holtz, Goodman & Woodward

[57] ABSTRACT

A lighting fixture for a vehicle has a plurality of light source units having light emitting diodes linearly disposed. The light source units are arranged parallel to each other at predetermined spaced relations, and spaces between the light source units serve as areas to be illuminated by incandescent bulbs.

15 Claims, 4 Drawing Figures

LIGHTING FIXTURE FOR VEHICLE

2. BACKGROUND OF THE INVENTION (1) Field of the Invention

The present invention relates to a lighting fixture for a vehicle (for example a rear combination lamp in which a tail stop lamp, a back-up lamp and a turn-signal lamp are conbined) which uses a light emitting diode and an incandescent bulb as a light source.

(2) Description of the Prior Art

For example, a rear combination lamp using only an incandescent bulb as a light source is constructed in such a manner that a back-up lamp portion 2 is positioned on one side of a tail stop lamp portion 1 and a turn-signal lamp portion 3 is positioned on the other side thereof.

Therefore, the ratio of a display surface of the tail stop lamp to the whole width of the lamp is decreased and as the result, the visibility is deteriorated.

3. OBJECT OF THE INVENTION

It is an object of the present invention to provide a lighting fixture for a vehicle which has an excellent visibility.

4. SUMMARY OF THE INVENTION

According to a feature of the present invention, a plurality of light source units having light emitting diodes linearly disposed are arranged parallel to each other at predetermined spaced relations, and spaces between the light source units are made to serve as areas to be illuminated by incandescent bulbs.

5. BRIEF DESCRIPTION OF THE DRAWINGS

6. DETAILED DESCRIPTION OF THE INVENTION

Figure 1:
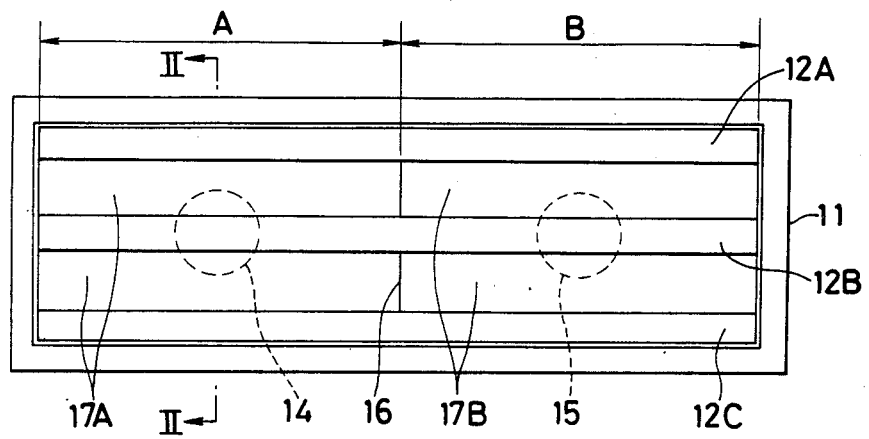
FIG. 1 is a front view showing an embodiment of a lighting fixture for a vehicle according to the present invention.
Figure 2:
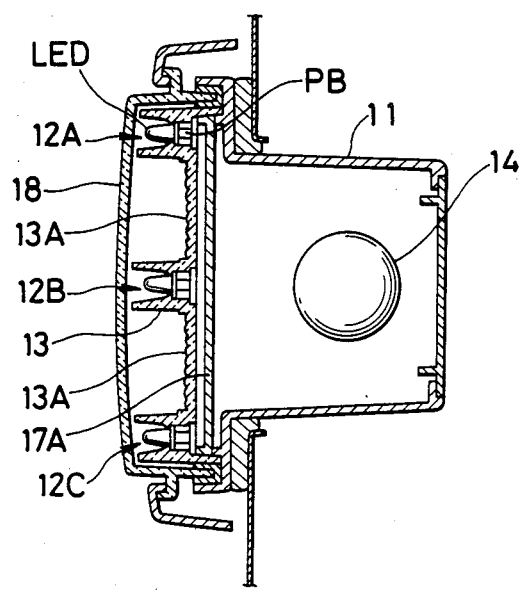
FIG. 2 is a sectional view taken on line II—II in FIG. 1.

FIGS. 1 and 2 show one embodiment of the present invention. Reference numeral 11 designates a housing, and 12A to 12C designate bar-like light source units having a number of red light emitting diodes (LEDs) linearly arrayed on a substrate PB, the light source units being arranged parallel to each other frontwardly of the housing in a predetermined spaced relation. A shade 13 is provided. These bar-like light source units 12A to 12C serve a light sources for tail stop lamps.

Reference numerals 14 and 15 designate incandescant bulbs which are mounted interiorly of the housing 11, between which is provided a partition 16. Reference numerals 17A and 17B designate color filters (inner lenses) arranged frontwardly of the housing 11 in such a manner that the color filters may be superposed on the shade 13, the filter 17A in a region A (leftside of the partitin 16) of FIG. 1 being amber for a turn-signal, the filter 17B in a region B (rightside of the partition 16) of FIG. 1 being white to indicate backward movement. The bulb 14 serves as a light source for a turn-signal lamp, and the bulb 15 serves a light source for a back-up lamp. Reference numeral 18 designates a cover arranged frontwardly of the light source units 12A to 12C and shade 13, the cover 18 being formed of a smoked and white transparent material.

A fish-eye cut 13A is formed in a portion of shade 13 between the light source units 12A–12B and 12B–12C. However, where the fish-eye cut is formed in the color filter 17A and/or 17B, the fish-eye cut in shade 13 is not necessary. The shade 13 is formed of a transparent material, and portions of the shade 13 other than the fish-eye cut portion are made to be opaque by aluminum sputtering or coating. Further, in the case where the housing 11 is not formed with a reflecting surface, the color filters 17A and 17B are applied with a fresnel cut to condense radiant lights of the bulbs 14 and 15 in a direction of an optical axis of the lamp.

With the construction as described above, when the light source units 12A to 12C are lighted by pulses, by changing the pulse width, switching between the stop light and the tail light functions may be carried out. In other words, a red display results, and the stop indication can be discriminated from the tail light indication according to the intensity of brightness. The tail and stop displays are provided over the whole width of the rear conbination lamp to enhance visibility.

On the other hand, the lighting of the incandescent bulbs 14 and 15 causes the display of amber turn-singnal and the display of white backward movement to be respectively provided.

Figure 3:
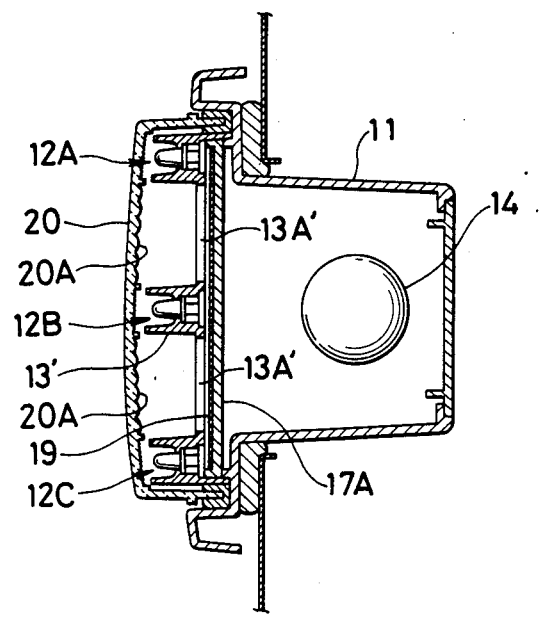
FIG. 3 is a sectional view showing another embodiment of the present invention.
Figure 4:
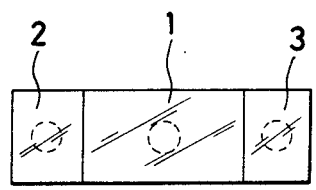
FIG. 4 is a schematiic front view showing a positional relationship of lamp portions or a conventional rear conbination lamp.

FIG. 3 illustrates another embodiment of the present invention. A film-like inner lens 19 is disposed frontwardly of the color filter 17A, 17B, an a shade 13' is formed of an opaque material. Openings 13A' are provided in a portion of shade 13' between the units 12A to 12C. The inner lens 19 is provided to discolor the color filters 17A and 17B so as to be hard to view from outside. The function of the fish-eye cut 13A mentioned in the previous embodiment is carried out by an outer lens 20 having a fish-eye cut 20A in the inner surface thereof.

Also in this case, the lighting control is similar to that of the previously described embodiment.

The present invention exhibits the following effects:

(1) Since the bar-like light source units using light emitting diodes are linearly arranged, with linear arrays spaced apart, the light is emitted over approximately the whole width of the rear combination lamp so that one may see the lamp as if it is a large lamp, thus improving visibility.

(2) Since different display colors of the lamp are provided in such a manner that the lamp is white when unlighted, and red while being lighted with the light emitting diode arrays, a high contrast results, thus improving visibility.

(3) The shade to which the light source units using light emitting diodes are secured serves as a visor, thus providing a false lighting preventive effect.

(4) By making the color of the shade the same color as that of the body of the vehicle, a lamp having a new sense integral with the body is provided.

(5) Where one sees the lamp from a remote place, the lamp may be seen as if the light emitting color of one and the same lens surface varies from red to amber or white, and therefore, it attracts attention. That is, the visibility is improved.

What is claimed is:

1. A lighting fixture for a vehicle, comprising:
   a housing;
   a plurality of light source units each including a plurality of light emitting diodes, said light source units emitting light of at least one color and said light source units being arranged relative to each other at predetermined spaced relations within said housing;
   at least one incandescent light bulb in said housing mounted rearwardly of said plurality of light source units; and
   light transmitting means in spaces between said light source units and arranged forwardly of said at least one incandescent light bulb so as to be illuminated by said at least one incandescent light bulb, said light transmitting means, when illuminated by said at least one incandescent light bulb, producing at least one different color light than that produced by said light source units.

2. The lighting fixture of claim 1, wherein said light transmitting means includes at least one color filter.

3. The lighting fixture of claim 2, comprising two of said color filters, each arranged in different spaces between said light source units.

4. The lighting fixture of claim 3, comprising two incandescent light bulbs in said housing and mounted rearwardly of respective ones of said color filters.

5. The lighting fixture of claim 4, including a shield between said incandescent light bulbs.

6. The lighting fixture of claim 1, wherein said light source units are linearly disposed.

7. The lighting fixture of claim 6, wherein said light source units are linearly disposed in a plurality of lines, said plurality of lines being arranged substantially parallel to each other at a predetermined spaced relation.

8. The lighting fixture of claim 7, wherein said light transmitting means includes at least one color filter.

9. The lighting fixture of claim 8, comprising two of said color filters, each arranged in different spaces between said light source units.

10. The lighting fixture of claim 7, comprising two incandescent light bulbs in said housing and mounted rearwardly of respective ones of said color filters.

11. The lighting fixture of claim 10, including a shield between said incandescent light bulbs.

12. The lighting fixture of claim 6, wherein said light transmitting means includes at least one color filter.

13. The lighting fixture of claim 12, comprising two of said color filters, each arranged in different spaces between said light source units.

14. The lighting fixture of claim 6, comprising two incandescent light bulbs in said housing and mounted rearwardly of respective ones of said color filters.

15. The lighting fixture of claim 14, including a shield between said incandescent light bulbs.

* * * * *